United States Patent
Kreisl et al.

(10) Patent No.: US 7,168,540 B2
(45) Date of Patent: Jan. 30, 2007

(54) COUPLING FOR A MECHANICAL PRESS, SHEAR, OR STAMPER

(75) Inventors: Joachim Kreisl, Leverkusen (DE); Norbert Gober, Odenthal (DE)

(73) Assignee: SMS Eumuco GmbH, Leverkusen (DE)

( * ) Notice: Subject to any disclaimer, the term of this patent is extended or adjusted under 35 U.S.C. 154(b) by 186 days.

(21) Appl. No.: 11/035,029

(22) Filed: Jan. 12, 2005

(65) Prior Publication Data
US 2005/0170932 A1 Aug. 4, 2005

(30) Foreign Application Priority Data
Jan. 14, 2004 (DE) ............. 10 2004 001 914

(51) Int. Cl.
*F16D 21/08* (2006.01)
(52) U.S. Cl. ............... 192/48.7; 192/87.11
(58) Field of Classification Search ........ 192/48.7, 192/87.11, 87.14, 87.15, 48.3, 113.34, 57; 100/282
See application file for complete search history.

(56) References Cited

U.S. PATENT DOCUMENTS

| | | | | |
|---|---|---|---|---|
| 2,899,897 A | * | 8/1959 | Ludwig | 192/48.7 |
| 3,018,863 A | * | 1/1962 | Elfes | 192/48.7 |
| 3,215,233 A | * | 11/1965 | Smith et al. | 192/48.7 |
| 3,279,572 A | * | 10/1966 | Dearnley | 192/48.7 |
| 3,625,323 A | * | 12/1971 | Hetmann | 192/3.26 |
| 4,784,019 A | * | 11/1988 | Morscheck | 74/720 |
| 5,605,210 A | * | 2/1997 | Koike et al. | 192/3.29 |
| 6,142,275 A | | 11/2000 | Kreisl | |
| 6,378,675 B1 | * | 4/2002 | Kundermann et al. | 192/3.27 |

FOREIGN PATENT DOCUMENTS

| | | |
|---|---|---|
| DE | 29 24 834 | 1/1981 |
| EP | 0 000 918 | 3/1979 |

* cited by examiner

*Primary Examiner*—Saul Rodriguez
*Assistant Examiner*—Justin K. Holmes
(74) *Attorney, Agent, or Firm*—Andrew Wilford

(57) ABSTRACT

A coupling has a low-torque/high-slip clutch connected between a drive output and an input constituted by a press, shear, or stamper, and a high-torque/low-slip clutch also connected between the output and the input. In a startup phase the low-torque/high-slip clutch is engaged and the high-torque/low-slip clutch is disengaged to bring the load input up to a predetermined rotary threshold speed. Thereafter in a working phase the low-torque/high-slip clutch is disengaged and the high-torque/low-slip clutch is engaged to drive the load at a rotary speed at least equal to the rotary threshold speed.

8 Claims, 1 Drawing Sheet

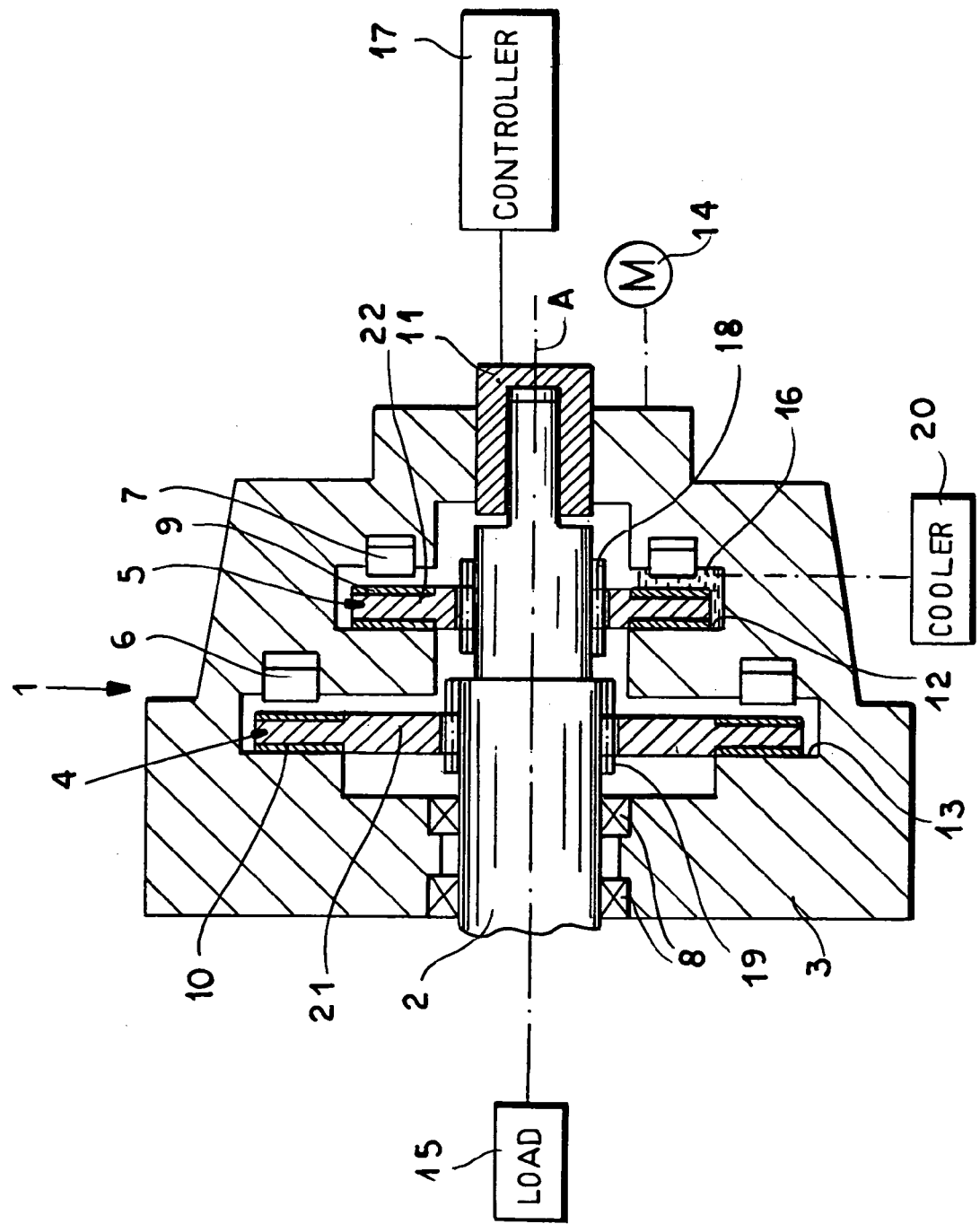

COUPLING FOR A MECHANICAL PRESS, SHEAR, OR STAMPER

FIELD OF THE INVENTION

The present invention relates to a coupling. More particularly this invention concerns a coupling used in a mechanical press, shear, or stamper.

BACKGROUND OF THE INVENTION

A machine such as a mechanical press, shear, or stamper that is used for high-energy metal cutting and/or shaping operations is described in German 2,924,834 of Zimmermann. Here the normally continuously rotating input element is connected to the rotary but only intermittently rotated output element by a pair of clutches, with a pair of brakes connected to the elements also. The two clutches are hydraulically independently actuatable. The redundancy of the clutches and brakes ensures that the system can be made to operate at least partially, or at least can be shut down, if one of the brakes or clutches fails. Thus the two clutches and the two brakes are substantially identical.

A press described in U.S. Pat. No. 6,142,275 of Kreisl has a nonrotating tube shaft centered on an axis, a rotatable output shaft coaxially received in the tube shaft and having a shaft end, and a supply of fluid under pressure. A brake element fixed on the tube shaft forms with an axially movable brake element angularly coupled with the output shaft a pressurizable brake chamber. A fluid line extending from the brake chamber through the tube shaft to the fluid supply can pressurize the brake chamber and thereby couple the brake elements with each other so that the output shaft is braked against the tube shaft. A flywheel rotatable about the axis on the tube shaft carries a first clutch element rotatable about the axis. A second clutch element rotatable about the axis adjacent the first clutch element forms therewith a pressurizable clutch chamber. Another fluid line extending from the clutch chamber to the fluid supply can pressurize the clutch chamber and thereby couple the clutch elements with each other so that the output shaft is coupled to the flywheel.

The problem with the coupling between a drive motor and a press, shear, or stamper is that it is normally designed as a compromise between the high slippage encountered at relatively low torque as the output element is brought up to speed and the low slippage encountered at relatively high torque during the actual metal deforming or cutting operation. It is necessary for the coupling to dissipate considerable heat during the startup phase during which only a relatively modest amount of torque is transmitted from the input element to the output element, while during the actual working phase that follows there is little slippage, so little heat is generated, while considerable torque is transmitted through the coupling.

OBJECTS OF THE INVENTION

It is therefore an object of the present invention to provide an improved coupling for connecting a drive motor to a mechanical press, shear, or stamper.

Another object is the provision of such an improved coupling for connecting a drive motor to a mechanical press, shear, or stamper that overcomes the above-given disadvantages, in particular that is equally efficient both during the startup and working phases.

SUMMARY OF THE INVENTION

These objects are achieved in a coupling having according to the invention a low-torque/high-slip clutch connected between a drive output and an input constituted by a press, shear, or stamper, and a high-torque/low-slip clutch also connected between the output and the input. In addition in a startup phase the low-torque/high-slip clutch is engaged and the high-torque/low-slip clutch is disengaged to bring the load input up to a predetermined rotary threshold speed. Thereafter in a working phase the low-torque/high-slip clutch is disengaged and the high-torque/low-slip clutch is engaged to drive the load at a rotary speed at least equal to the rotary threshold speed.

With this system, therefore, the system is brought up to speed by means of the low-torque/high-slip clutch which can according to the invention be set up, e.g. by providing it with a cooler, to dissipate the considerable heat generated by the slippage during the startup phase. During this startup phase the load is not normally operating so that only a reduced amount of torque need be transmitted from the drive to the load's input. During the subsequent working phase, when the load is actually operating, the considerable torque needed is transmitted to it from the drive through the high-torque/low-slip clutch. There is therefore no tradeoff between the two functions. The two clutches are specifically built for their jobs.

When the load is, as mentioned, constituted by some sort of metal-deforming machine like a press, shear, or stamper, there is typically a continuously rotating and relatively massive flywheel that is connected via a shaft and crank to some sort of tool, plate, blade, or the like. The crankshaft must be gotten up to speed before the machine actually starts working, then must be maintained at this speed as the metal of the workpiece is deformed, forged, cut, stamped, or otherwise worked.

According to the invention a coolant is circulated only through the low-torque/high-slip clutch. Thus the low-torque/high-slip is a wet clutch while the other clutch is a dry clutch.

The low-torque/high-slip clutch has a nominal torque rating equal to at most one-quarter a nominal torque rating of the high-torque/low-slip clutch. Both clutches are friction clutches and both include a fluid-powered, that is hydraulic or pneumatic, actuator.

BRIEF DESCRIPTION OF THE DRAWING

The above and other objects, features, and advantages will become more readily apparent from the following description, reference being made to the accompanying drawing whose sole FIGURE is a partly diagrammatic axial section through a coupling according to the invention.

SPECIFIC DESCRIPTION

As seen in the drawing, a coupling 1 according to the invention is intended to be connected between a normally continuously operating drive motor 14 whose output is connected to a flywheel 3 and a load 15, here a mechanical press, shear, or stamper, whose input is connected to a shaft 2 that is supported by bearings 8 in the flywheel 3. Both the flywheel 3 and shaft 2 are centered on and rotate about a common axis A. The motor 14 normally continuously rotates the flywheel 3. The input element constituted by the flywheel 3 can be coupled to the output element constituted by the shaft 2 by either of two clutches 4 or 5 that are operated alternately by a controller 17.

More specifically, the clutch 5 is intended to transmit low torque with high slip and is only used during an initial startup phase, that is when the output shaft 2 is bring brought from a standstill up to predetermined operating speed. The clutch 5 has a plate 22 that can shift axially on splines 18 on the shaft 2, that sits in a liquid bath 16 that is cooled by a cooler 20, and that has friction faces 9 that can be pressed against a face 12 of the flywheel 3 by a hydraulic actuator 7 operated by the controller 17 through an end fitting 11 on the shaft 2 by the controller 17.

The clutch 4 runs dry and is intended to transmit high torque with low or no slip and is only used during a working phase, that is after the output shaft 2 has been brought up to the predetermined operating speed and when the press, shear, or stamper constituted by the load 15 is actually working. The clutch 4 has a plate 22 that can shift axially on splines 19 on the shaft 2. This clutch plate 22 has friction surfaces 10 that can be pressed against a face 13 of the flywheel 3 by a hydraulic actuator 6 also operated through the end fitting 11 by the controller 17.

Thus with this invention before the load 15 is working, the drive 14 is rotating the flywheel 3 at a predetermined speed, normally the nominal operating speed of the load 15, but the shaft 2 connected to the load 15 is stationary, that is not rotating. The controller 17 then pressurizes the actuator 7 to close the low-torque/high-slip clutch 5, while at the same time the actuator 6 of the clutch 4 is not pressurized so no torque is transmitted by the clutch 4. The low-torque/high-slip clutch 5 is operated alone and is cooled by the cooler 20 until the shaft 2, which is still not operating under load, has been brought up to its nominal or threshold speed.

At this time the clutch 4 is closed by its actuator 6 and the clutch 5 is opened and thereafter substantially all torque is transmitted from the flywheel 3 to the shaft 2 through this clutch 4. This clutch 4, being designed to transmit high torque at low slip, can easily drive the load 15. According to the invention the clutch 4 is designed to transmit three or four times the torque as the clutch 5.

We claim:

1. In combination with a drive having a rotary output and a load having a rotary input, a coupling comprising:
    a low-torque/high-slip clutch connected between the output and the input;
    a high-torque/low-slip clutch also connected between the output and the input; and
    control means for
        in a startup phase engaging the low-torque/high-slip clutch and disengaging the high-torque/low-slip clutch to bring the load input up to a predetermined rotary threshold speed and for thereafter
        in a working phase disengaging the low-torque/high-slip clutch and engaging the high-torque/low-slip clutch to drive the load at a rotary speed at least equal to the rotary threshold speed.

2. The coupling defined in claim 1 wherein the load is a mechanical press, shear, or stamper.

3. The coupling defined in claim 1, further comprising
    means for circulating a coolant only through the low-torque/high-slip clutch.

4. The coupling defined in claim 1 wherein the low-torque/high-slip clutch is a wet clutch.

5. The coupling defined in claim 1 wherein the low-torque/high-slip clutch has a nominal torque rating equal to at most one-quarter a nominal torque rating of the high-torque/low-slip clutch.

6. The coupling defined in claim 1 wherein the high-torque/low slip clutch is a dry clutch.

7. The coupling defined in claim 1 wherein both clutches are friction clutches.

8. The coupling defined in claim 1 wherein both clutches include a fluid-powered actuator.

* * * * *